United States Patent [19]

Ferreira

[11] Patent Number: 5,603,783
[45] Date of Patent: Feb. 18, 1997

[54] STEERING WHEEL

[75] Inventor: Cornelius J. T. Ferreira, Eskom, South Africa

[73] Assignee: M. J. Grootes Investments CC, Johannesburg, South Africa

[21] Appl. No.: 263,182

[22] Filed: Jun. 21, 1994

[30] Foreign Application Priority Data

Jun. 22, 1993 [ZA] South Africa .............................. 93/4470

[51] Int. Cl.$^6$ ....................................................... C22F 1/04
[52] U.S. Cl. ......................... 148/549; 148/539; 148/437; 164/114; 164/138; 164/286; 164/DIG. 3; 164/DIG. 14; 420/548; 420/549
[58] Field of Search ..................... 148/539, 549, 148/437; 420/548, 549; 74/552; 164/114, 138, 286, DIG. 3, DIG. 14; 29/894.1

[56] References Cited

U.S. PATENT DOCUMENTS

| | | | |
|---|---|---|---|
| 4,920,821 | 5/1990 | Shinto et al. | 74/552 |
| 5,217,546 | 6/1993 | Eady et al. | 148/549 |

FOREIGN PATENT DOCUMENTS

| | | |
|---|---|---|
| 0050309 | 4/1982 | European Pat. Off. . |
| 2058694 | 4/1981 | United Kingdom . |

OTHER PUBLICATIONS

"Metals Handbook, 10th Edition, vol. 2, 1990". ASM International, p. 132, col. 3, Strontium.

Metals Handbook (9th Edition); vol. 15: Casting; ASM International: Metals Park, Ohio; 1988; pp. 300–307.

Primary Examiner—David A. Simmons
Assistant Examiner—Robert R. Koehler
Attorney, Agent, or Firm—Walter H. Dreger; Michael A. Kaufman

[57] ABSTRACT

A one-piece steering wheel is formed as a unitary casting from an alloy that includes 11.5% to 14% by weight silicon, and 350 to 450 parts per million strontium. Preferably the steering wheel mold is rotated during casting at relatively high rotational speeds exerting 100 g to 250 g force on the wheel. An optimum rotational speed is disclosed. A one-piece steering wheel formed according to the invention exhibits minimal length ferro-silicon hair-like strands, and thus exhibits reduced brittleness.

11 Claims, 3 Drawing Sheets

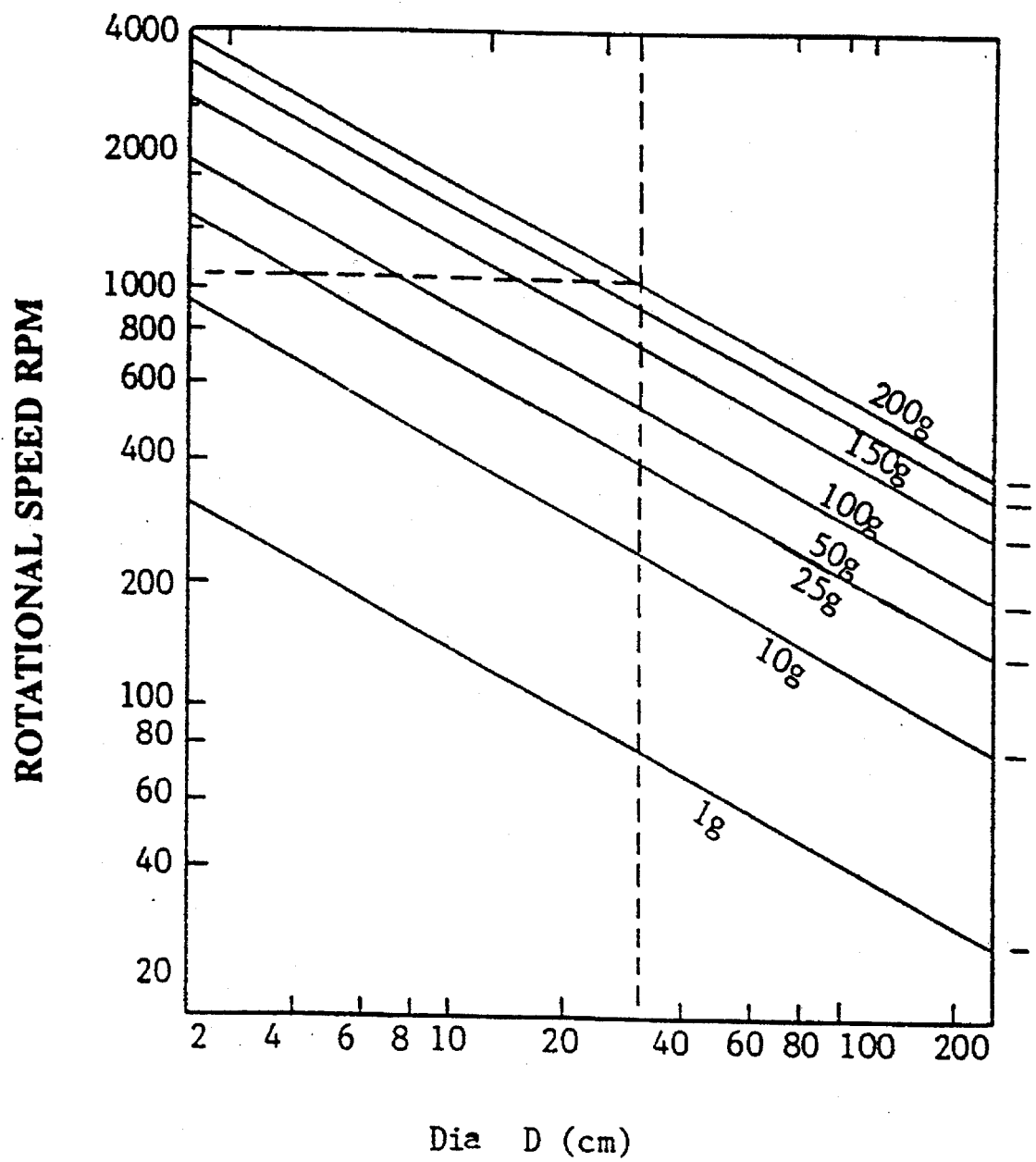
FIG._1

FIG._2 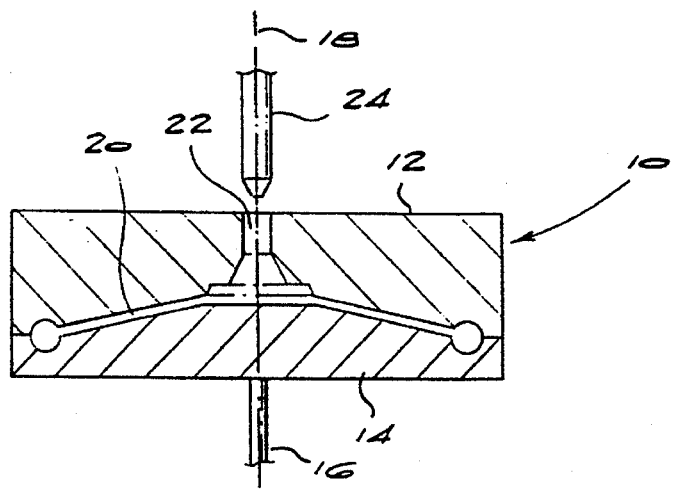
FIG._3 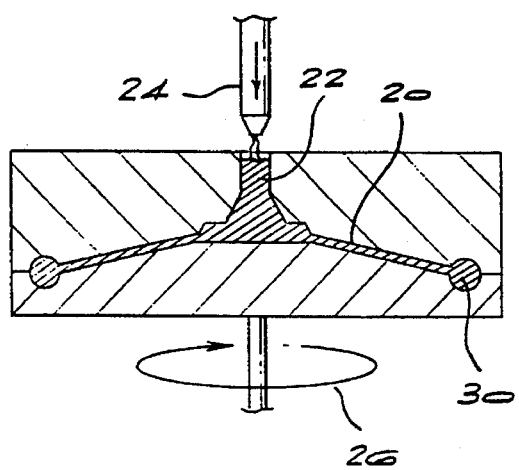
FIG._4 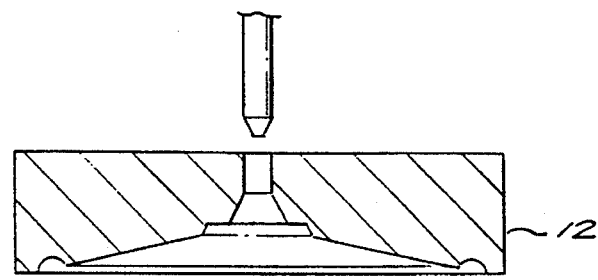
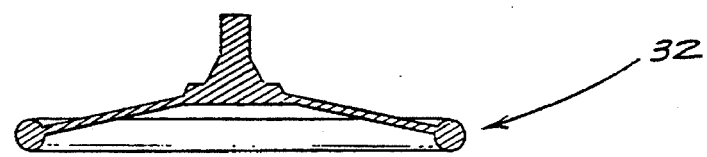
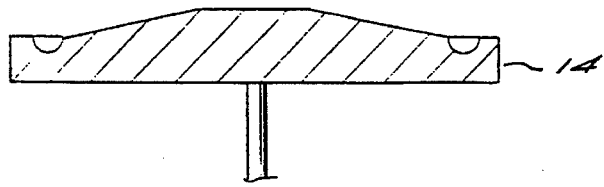

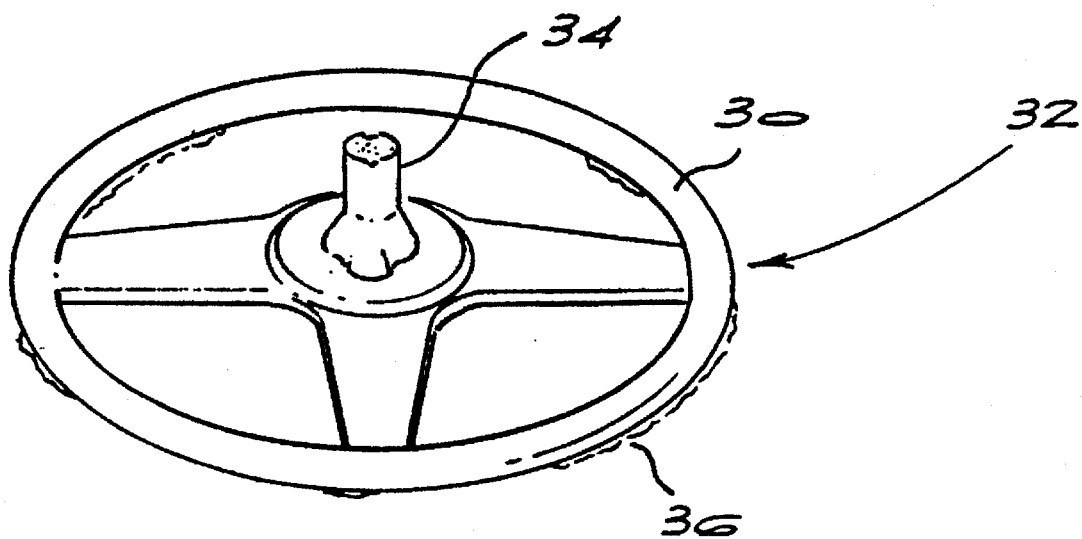
FIG._5
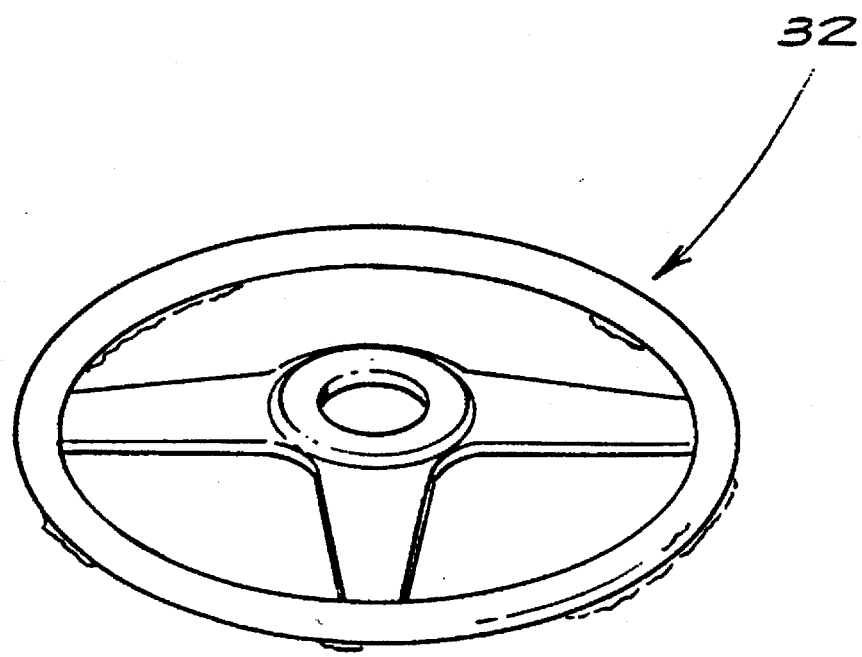
FIG._6

STEERING WHEEL

BACKGROUND TO THE INVENTION

THIS invention relates to a steering wheel, and more particularly, to an aluminium steering wheel.

Steering wheels are generally fabricated from a number of different components including a metal rim, spokes, and a central hub which connects to the steering column. The rim is generally covered with a resilient foam material or the like after the metal components have been interconnected. There are various problems with this prior art type of steering wheel including problems relating to connecting the distal ends of the spokes to the rim. Generally the point of connection between the rim and the spokes is found to be a zone of weakness for most wheels.

Steering wheels are safety critical components in most vehicles. It is important that the steering wheel is able to absorb a high impact load and preferably will deform under load rather than break. It is well known that cast materials tend to shatter rather than bend. It is also known that castings often crack and, accordingly, casting processes are not usually considered appropriate for the manufacturer of steering wheels.

Applicant is aware of certain prior art which contemplates cast aluminium steering wheels. European applications nos. EP-A-0292038, EP-A-0412605 and EP-A-0050309 all deal with the concept of cast steering wheels. However, none of the prior art specifications referred to satisfy Applicant's requirements that the steering wheel be cast as a one piece casting, that the wheel is of high strength and relatively resilient, and that it can be made crack-free.

SUMMARY OF THE INVENTION

According to the invention there is provided a steering wheel which is cast as a one-piece aluminium alloy casting, said alloy including 11.5–14% by weight of silicon, and 350–450 parts per million strontium. The preferred range is 12.5–12.6% silicon and 380–420 parts per million strontium.

The steering wheel may be cast in a casting process which includes the step of rotating the mould about the axis of the steering wheel.

An example of an alloy for the steering wheel comprises:

|  | % by weight |
| --- | --- |
| Cu | 0.04 |
| Mg | 0.04 |
| Si | 12.56 |
| Fe | 0.38 |
| Mn | 0.34 |
| Ni | 0.01 |
| Zn | 0.01 |
| Ti | 0.06 |
| Pb | 0.01 |
| Sn | 0.01 |
| Sr | 420 ppm |
| Pure aluminium | Remainder |

It is found that a characteristic of this alloy is that the ferro-silicon hair-like strands which are found in aluminium-silicon alloys are absent or at least are very short. It is the addition of the strontium into the alloy which gives the alloy this characteristic. The preferred alloy one where the ferro-silicon in the alloy is in the form of small, round bead-like particles. Where the ferro-silicon is in bead-like particles the alloy tends to be resilient. The long ferro-silicon strands tend to make the alloy brittle which is dangerous for steering wheels. It is thus important when selecting the exact constituents of the alloy to ensure that the strontium and silicon constituents of the alloy are carefully controlled so that formation of the ferro-silicon strands is prevented.

The material from which the mould is made is also important to ensure proper formation of the wheel within the mould during rotation of the mould. The alloy should comprise 2 to 4% by weight of copper and 5 to 7% by weight of silicon. This alloy is dimensionally relatively stable and compatible with the wheel alloy. A preferred mould alloy comprises:

|  | % by weight |
| --- | --- |
| Cu | 2.90 |
| Mg | 0.15 |
| Si | 6.00 |
| Fe | 0.55 |
| Mn | 0.51 |
| Ni | 0.06 |
| Zn | 0.30 |
| Ti | 0.03 |
| Pb | 0.03 |
| Sn | 0.03 |
| Pure aluminium | Remainder |

The mass of the mould is preferably approximately 30 times the mass of the steering wheel to be cast so that the mould is able to absorb the heat of the wheel without degradation. The material is similar to that of the wheel so that the heat loss from the wheel during cooking does not have the effect of altering the molecular structure of the alloy.

The rotational speed of the mould is important to ensure the centrifugal force on the material being moulded is optimized. The centrifugal force acting upon a rotating body is proportional to the radius of rotation and to the square of the velocity. Thus $$F_r = mr\omega^2 = \frac{mv^2}{r}$$

Where:

$F_r$=centrifugal force m=mass r=radius $\omega$=angular velocity v=peripheral speed The gravitational force on the same mass would be given by:

$$F_g = mg$$

where g is acceleration due to gravity.

Hence the factor which the normal force of gravity is multiplied by during rotation is given by:

$$G\text{factor} = \frac{F_r}{F_g} = \frac{r\omega^2}{g}$$

Expressed in the more convenient speed units of revolutions per minute N the expression becomes:

$$Gfactor = \frac{r}{g}\left(\frac{\Pi}{30}\right)^2 N^2 = \frac{0.011rN^2}{g}$$

More usefully:

$$N = \left(\frac{Gfactor \times g}{0.011r}\right)^{1/2} = 29.9\left(\frac{Gfactor}{r}\right)^{1/2} = 42.3\left(\frac{Gfactor}{D}\right)^{1/2}$$

Where D is rotational diameter expressed in meters.

This can also be expressed as per the graph shown in FIG. 1 to determine the optimal speed of rotation for different diameters. A correction of 0.26 has been allowed for due to the specific gravity of the special material.

A component density test will determine what degree of correction will be required. A test conducted on product manufactured in accordance with the invention produced in accordance with the description herein had a resistance to breaking of in excess of 4000 Kg. This is a safety factor of 10 over the expected maximum forces to be applied to a steering wheel under normal operating conditions.

The rotational speeds achieved by rotation according to the above formula according to the above formula will have the effect of substantially increasing the force in the moulten alloy, particularly the material which flows into the radially outer parts of the mould to form the rim of the steering wheel. This ensures that the molecular structure of the alloy does not alter during mould rotation. The alloy thus retains its resilient characteristics and the cast product is crack-free.

A unitary construction aluminium alloy steering wheel is advantageous for a number of different reasons. These include the fact that, once the mould has been constructed the manufacture of the steering wheels thereafter will be a relatively non-labour intensive operation. The steering wheels will be light weight and will be relatively non-corrodible and thus suitable for use in marine applications.

BRIEF DESCRIPTION OF THE DRAWINGS

FIG. 1 shows a range of curves depicting the relationship between the rotational speed of the mould and diameter of the steering wheel;

FIG. 2 shows a sectional side view of a mould for the manufacture of a steering wheel according to the invention;

FIG. 3 shows the mould of FIG. 2 filled with alloy;

FIG. 4 shows the moulded product and mould of FIG. 2 during removal of the product from the mould;

FIG. 5 shows a perspective view of the moulded product after it has been removed from the mould; and FIG. 6 shows a perspective view of the finished product.

DETAILED DESCRIPTION

FIG. 1 depicts the rotational formula referred to in the specification in diagrammatic form. For different wheel diameters the optimal rotational speed can be selected. Thus, the dotted lines shown in the drawing depict the selected rotational speed for a 30 cm diameter wheel. The set of diagonal lines shown in the diagram depict different pressures experienced by wheels moulded in rotating moulds. The uppermost curve, for example, is marked as "200 g", that is, it represents a force of 200 times the force of gravity. Where it is found that a particular wheel configuration requires a force of 200 g it can be calculated from the curve what the rotational speed will need to be. The dotted lines show that for a 30 cm wheel to be moulded at a force of 200 g it will need to be rotated at a speed slightly more than 1000 rpm.

Generally, for any particular wheel/mould configuration, there will be a need to conduct tests on the molecular make-up of the finished product to find the optimum rotational speed. In practice, for most wheel configurations, it is found that the alloy should be subjected to force by rotation to between 100 g and 250 g. It will be a relatively quick experimental procedure working within those limits to find the optimum rotational speed.

It is found that by increasing the force using rotational moulding techniques as opposed to other "artificial" force inducing techniques, the cast material has very low internal stresses and thus the cast product experiences very little distortion after being removed from the mould. Also problems with porosity and associated corrosion that have been found to occur with alloys moulded under force applied by rams or the like are not found with this method of casting.

FIGS. 2 to 4 depict, somewhat diagrammatically, the method of manufacture. As shown, a mould 10 comprises an upper section 12 and a lower section 14. The lower section 14 is mounted on a spindle 16 and is rotatable on an axis 18. A mould cavity 20 in the form of a steering wheel is defined between the two mould halves. An alloy inlet 22 is defined on the axis 18 for introducing alloy into the cavity 20. Alloy is adapted to be introduced into the cavity by means of a ladle spout 24. The mould 10 may be heated prior to the introduction of alloy into the mould cavity 20, the preferred temperature being approximately 260° C. The temperature of the alloy to be introduced into the mould cavity will be approximately 1100° C.

To manufacture the steering wheel the mould is clamped shut as shown in FIG. 2 and is rotated on its axis as indicated by rotational arrow 26, as shown in FIG. 3. Whilst being rotated, alloy is introduced via the spout 24 into the inlet 22 until the entire cavity is filled as shown in FIG. 3. The rotational speed will be selected in accordance with the curves shown in FIG. 1. The rotational speed will be such that the alloy in the rim 30 of the wheel is at a pressure significantly higher than atmospheric force. This will ensure that the rim 30 is crack-free and that alloy properly fills all interstices of the cavity 20. It is found that a rotation time of about 20 seconds at terminal speed is satisfactory for proper casting.

As shown in FIG. 4, once the alloy has cooled sufficiently so that the steering wheel is solid and stable the mould halves 12 and 14 can be separate as indicated in FIG. 4 and the steering wheel 30 can be removed from the two mould halves. It is found that the whole cycle can be reduced to about 35 seconds per steering wheel. Conventionally fabricated wheels take about half an hour per wheel to manufacture.

The steering wheel as it comes out of the mould is shown in FIG. 5 of the drawings. It is found in practice that virtually no machining of the steering wheel needs to be done. Generally the inlet stem 34 is cut-off and possibly minor imperfections might be cleaned up. The mould "skirt" as indicated at numeral 36 which is defined at the join between the two mould halves can be left on the rim 30 and need not be removed since that skirt 36 will generally be covered by a foam grip or leather cover and the skirt will enhance the adhesion between the foam and the rim. The finished product is shown in FIG. 6 of the drawings. That product is ready for mounting to the steering column of the vehicle.

The alloys described herein have proved satisfactory for the manufacture of both the mould and the steering wheels, but variations may be made to these alloys which would still prove to be satisfactory in operation. The important criteria for the steering wheel alloy is the relative proportions of silicon and strontium to ensure the silicon does not form into long hair-like ferro-silicon strands on cooling which would result in unacceptable stiffness.

I claim:

1. A one-piece steering wheel that is deformable under load and comprises a hub, spokes, and rim, integrally formed as a unitary aluminum alloy casting, said alloy including 11.5% to 14% by weight of silicon and 350 to 450 parts per million of strontium;

wherein said alloy exhibits bead-like particles composed of ferro-silicon that promote resiliency in said steering wheel.

2. A steering wheel according to claim 1, wherein said alloy has 12.5% to 12.6% by weight of silicon.

3. A steering wheel according to claim 1, wherein said alloy has 380 to 420 parts per million of strontium.

4. A steering wheel according to claim 1, wherein said alloy comprises constituents substantially as follows:

|  | % by weight |
| --- | --- |
| Cu | 0.04 |
| Mg | 0.04 |
| Si | 12.56 |
| Fe | 0.38 |
| Mn | 0.34 |
| Ni | 0.01 |
| Zn | 0.01 |
| Ti | 0.06 |
| Pb | 0.01 |
| Sn | 0.01 |
| Sr | 420 ppm, and |
| pure aluminum | Remainder. |

5. A process for the manufacture of a one-piece steering wheel that is deformable under load and comprises a hub, spokes, and rim, integrally formed as a unitary alloy casting, said alloy casting exhibiting bead-like particles composed of ferro-silicon that promote resiliency in said steering wheel, said process comprising the steps of:

a) preparing a rotatable mold in which said steering wheel is to be cast;

b) introducing into said mold a molten alloy having constituents including 11.5% to 14% by weight of silicon and 350 to 450 parts per million of strontium;

c) rotating said mold; and d) after allowing said alloy to cool; removing the manufactured said steering wheel from said mold.

6. A process according to claim 5, wherein said mold is rotated at a speed of N revolutions per minute where $$N = 42.3 \sqrt{\frac{Gfactor}{D}}$$

D=diameter of said steering wheel, r=rotational radius, and ω=rotational angular velocity.

7. A process according to claim 5, wherein said mold is manufactured from an aluminum alloy that includes 2% to 4% by weight of copper, and 5% to 7% by weight of silicon.

8. A process according to claim 7, wherein said aluminum alloy comprises substantially constituents substantially as follows:

|  | % by weight |
| --- | --- |
| Cu | 2.90 |
| Mg | 0.15 |
| Si | 6.00 |
| Fe | 0.55 |
| Mn | 0.51 |
| Ni | 0.06 |
| Zn | 0.30 |
| Ti | 0.03 |
| Pb | 0.03 |
| Sn | 0.03 |
| Pure aluminum | Remainder. |

9. A process according to claim 5, wherein said mold is rotated at a speed sufficient to induce a force ranging from 100 g to 250 g in a rim of said steering wheel undergoing fabrication during rotation.

10. An alloy having bead like particles composed of ferro-silicon such that when cast said alloy exhibits resiliency, comprising:

|  | % by weight |
| --- | --- |
| Cu | 0.04 |
| Mg | 0.04 |
| Si | 12.56 |
| Fe | 0.38 |
| Mn | 0.34 |
| Ni | 0.01 |
| Zn | 0.01 |
| Ti | 0.06 |
| Pb | 0.01 |
| Sn | 0.01 |
| Sr | 420 ppm, and |
| pure aluminum | Remainder. |

11. The process of claim 5, wherein said mold has a mass that is approximately 30 times a mass of said steering wheel.

* * * * *